United States Patent Office 3,461,01?
Patented Aug. 12, 1969

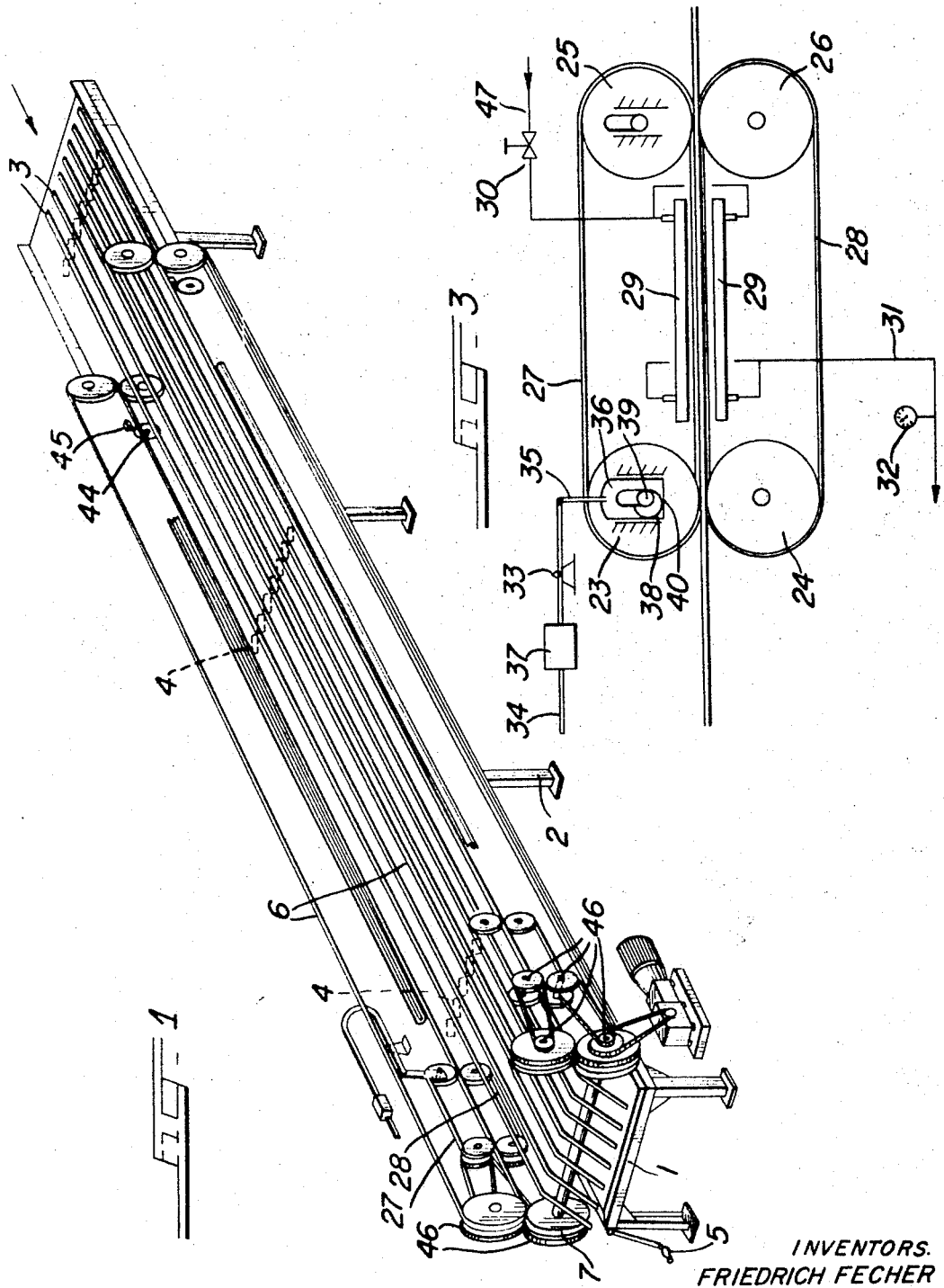

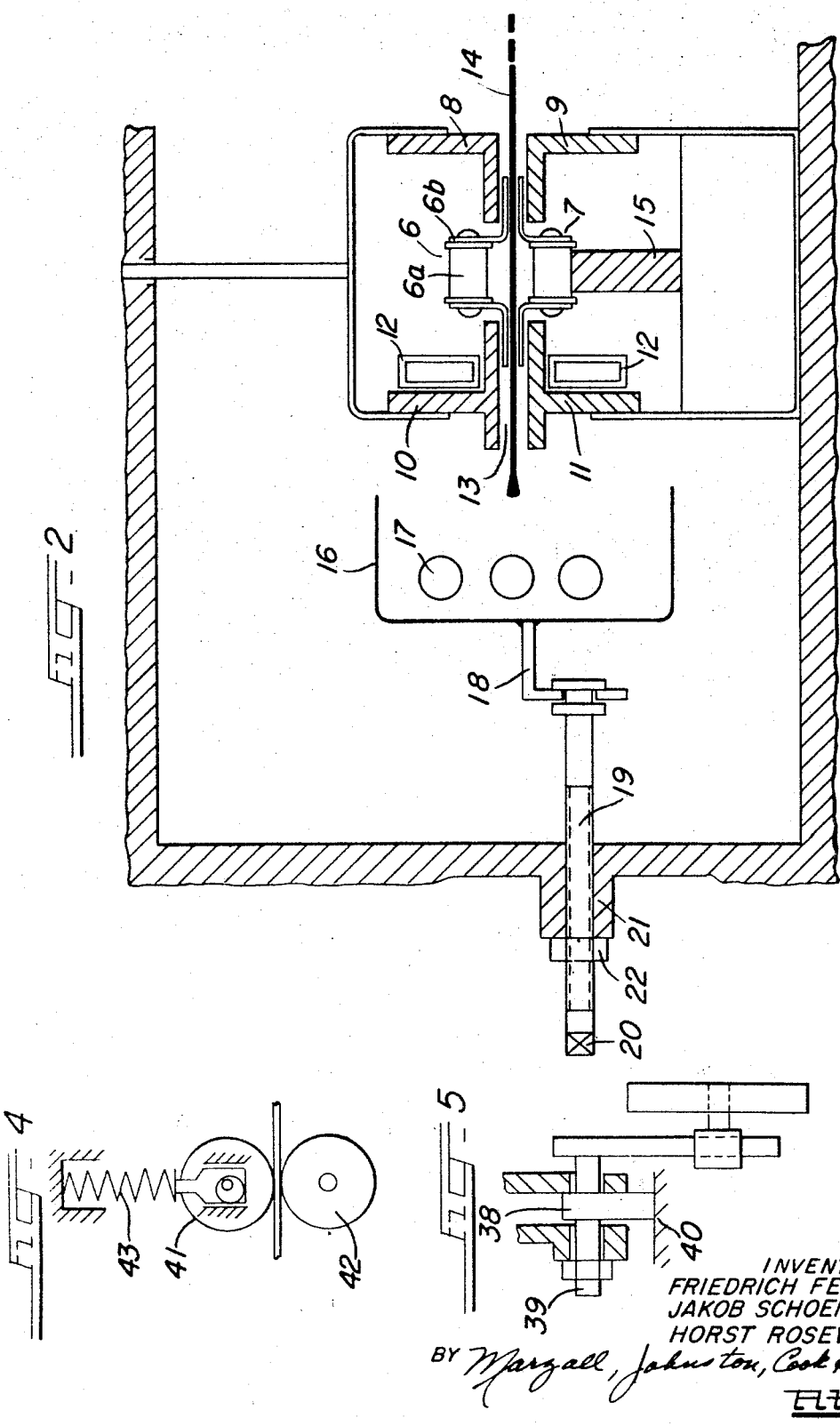

3,461,017
APPARATUS FOR THE PRODUCTION OF WELDED BAGS FROM THERMOPLASTIC TUBULAR SHEETING BY MEANS OF RADIANT HEAT
Friedrich Fecher, Jakob Schoenmann, and Horst Rosewicz, Ludwigshafen (Rhine), Germany, assignors to Badische Anilin- & Soda-Fabrik Aktiengesellschaft, Ludwigshafen (Rhine), Germany
Filed Feb. 17, 1966, Ser. No. 528,227
Claims priority, application Germany, Feb. 19, 1965, B 80,601
Int. Cl. B32b 31/20
U.S. Cl. 156—380     10 Claims

ABSTRACT OF THE DISCLOSURE

Apparatus for continued production of welded bags of thermoplastic tubular sheeting embodying horizontally disposed slide rails, opposing pairs of chains on each side of and spaced laterally from the slide rails, pressure contact members on the chains in pressure contact in the plane of the rails and between opposing guide rails, elongated radiant heating means adjacent said pairs of chains, cooling means on the guide rails, cooled steel endless tapes running horizontally in the direction of travel at the rear end and parallel to the roller chains with the middle strands of each pair of tapes in pressure contact, and spring-urged groove rollers providing shaping stations.

---

It is known that welded bags of thermoplastic tubular sheeting with side folds and a valve may be made continuously by cutting the tubular sheeting into sections, providing the sections, laid flat, with side folds and a valve in a conventional manner and at the same time cutting them at the top and bottom ends by cuts through all the folds, and by heating the cut surfaces at each end by radiation, melting them and welding them together to form a thickened seam. The welds are kept under pressure until they have cooled. The welded bags are then discharged.

The apparatus employed for carrying out this method comprises a horizontal frame, a motor-driven endless elastic belt which runs over two horizontal terminal drums and serves for conveying the individual sheet sections placed flat on the belt with their ends projecting from each side of the belt. One disadvantage of this machine is that it does not permit sheet sections of different lengths to be welded. Moreover, the flat conveyor belt is apt to cause trouble.

We have now found that high quality strong faultless welds can be formed by irradiation in the continuous production of welded bags from thermoplastic tubular sheeting by using apparatus which according to the present invention comprises, in a horizontal support frame, a plurality of parallel, horizontal, laterally movable slide rails which are interconnected by laterally expandable lazy tongs and adapted to carry the sheet sections; two vertical pairs of roller chains travelling on each side of and in spaced relationship to the slide rails in horizontal paths over motor-driven chain wheels in such manner that the chains of each pair are in pressure contact in the plane of the slide rails; rails for guiding the four roller chains; adjacent to each of the two pairs of chains a source of radiant heat which is electrically heated and positionally adjustable in relation to the outer edges of the chains; water-cooled cooling tubes on each side of the guide rails and partly contacting the same, arranged to jut out towards the radiation source and to project beyond the chain edges between the guide rails; a pair of short steel tapes cooled by cooling tubes and horizontally running in the direction of travel at the rear end of and parallel to the roller chains over two motor driven wheels in such manner that the middle strands of each pair of steel tapes are in pressure contact; a level device with a slidably movable weight as well as two shaping stations comprising two pairs of grooved rollers which are forced towards each other as far as a minimum clearance stop means will permit.

Cooling bars are located between the chain and the radiation source.

In order to minimise wear of the guide rails these are preferably hard chromium plated. They are harder than the chains. For reducing the wear of the chains the chain links are supported by plastic strips.

The cooling bars are cooled by a coolant. To this end they are connected with a supply pipe containing a valve.

In order to ensure that the grooved rollers apply a uniform pressure, a spring is arranged between the frame and the roller shaft.

On either side of the front end of the apparatus there is provided at right angles to the plane of the two strands pressed against each other, of the pair of chains a motor driven rotating knife which is continuously adjustable positionally in relation to the chain edges, and which cooperates with a fixed counterblade.

The source of radiation preferably comprises quartz tubes movably mounted and enclosed on the outside by a reflector. They may also be movable together with the reflector.

An embodiment of the proposed apparatus is shown by way of example, in the drawings in which FIG. 1 is an overall view of the apparatus, FIG. 2 is a section o the conveyor means, FIG. 3 is the cooling station, FIG 4 are the means for pressing down the weld and FIG 5 is the stop device.

The apparatus (FIG. 1) comprises a frame 1 standing on feet 2 and containing a plurality of parallel slide rails 3 for guiding the sheet sections. The spacing of the slide rails can be varied by expanding lazy tongs 4 to adjust the overall width to sheet sections of different lengths. A crank handle 5 enables the slide rails to be pulled apart to the desired width through shafting bevel wheels and feed screws not shown in the drawing For conveying the sheet sections, roller chains are located on each side of the slide rails, an upper roller chain 6 and a lower roller chain 7 (FIG. 2) being provided on each side. The roller chains comprise the chain 6a proper and bent straps 6b which are riveted to the rollers. The straps are guided by rails, on the outsid between an upper guide rail 8 and a lower guide rail 9 and on the inside by an upper cooled guide rail 1 and a lower cooled guide rail 11.

The guide rails 10 and 11 are cooled by cooling bar 12. The straps 6b slide in the gap 13 between the two pairs of guide rails which press the straps together from each side onto the sheet sections 14.

The center portions of the chain links in the uppe strands of the roller chains are supported by a plastic strip 15 to reduce wear of the guide rails. On each sid and spaced away from the roller chains is a reflector 1 enclosing a plurality of quartz tubes 17 which are th sources of radiation. The intensity of radiation may b varied by moving an arm 18 carrying the reflector an the associated radiation source. To this end the arm i attached to a threaded member 19 which can be ax ally displaced by rotating the same from a square en 20 in the threads 21 of a box. The member can be se cured in any position by a locknut 22.

For cooling the sheet material which is pressed to gether after having been welded a cooling station (FIG 3) is provided. This consists of an upper drive wheel 2 and a lower drive wheel 24 facing an upper guide whee 25 and a lower guide wheel 26 respectively. Steel tapes 27 and 28 run between the wheels. A pair of steel tapes is located on each side of the slide rails. The tapes are cooled by cooling tubes 29 resiliently pressed into contact with the tapes. The rate of supply of the cooling water is controlled by a valve 30 and the temperature of the outflowing cooling water is measured by a thermometer 32 in the cooling water pipe 31. Through a linkage 35 a lever 34 turning about a pivot 33 controls the position of a guide member 36 which carries the shaft of the driving wheel 23. For compensating expansion and stresses the free end of the lever 34 carries a sliding weight 37.

The weld is shaped in the shaping station by means of two grooved rollers 41 and 42 which are urged towards each other by a spring 43 generating an adjustable thrust (FIG. 4).

FIG. 5 shows the disposition of the stop means which comprise an eccentric disc on the shaft guides of the drive wheels. The downward movement of the guide member carrying the shaft of the drive wheel 23 is limited by rotating the eccentric 38 about shaft 39 and thereby selectably adjusting the distance of this shaft from a fixed abutment 40.

Whilst in contact with the weld, the edge of the cooled steel tape should not project into the softened zone of the sheeting because this would produce an indentation in the weld and thus weaken the same. Since the portion projecting beyond the edge of the straps of the chain towards the radiation source is always fused as far as the edge of the straps, the edge of the steel tape cannot make contact with a nonplastic zone unless the compensating station is located in working direction behind the drive wheels of the roller chains. However, this arrangement involves difficulties in respect of design.

In order to ensure that the weld will be sufficiently strong after leaving the welding zone, the water-cooled cooling bars above and below the chain are taken forward beyond the edge of the roller chain towards the radiation source.

Consequently the portion facing the radiation source will be exposed to the full intensity of the radiation as far as the edge of the advanced cooling bar, but shielded and thus only partly exposed from the edge of the cooling bar to the edge of the chain strap. After having left the shielded zone a sufficiently wide portion of sheeting exhibiting two different zones of fusion will thus be available. The edge facing the bag centre of the adequately wide steel tape will thus bear down on a consolidated region so that the formation of indentations will be avoided. Moreover, the temperature drop in the weld zone operates to reduce internal stress after welding.

It has been found that the pressure required for controlling the thickness of the weld can be readily adjusted as soon as the weld, by cooling, has reached a state of highly viscous plasticity. The shaping station comprising two wheels 41, 42, which are located one above the other and can be pressed together with an adjustable degree of contact pressure, is therefore arranged downstream of the cooling station. The shafts of the two wheels can be so located by two eccentric discs in an arrangement resembling the stop means at the cooling station that the contact pressure will be nil when the distance between the two wheels equals twice the thickness of the sheet material. This also serves to avoid the formation of indentations.

The welding speed depends upon the rate of heat absorption. This is very high because the radiation source comprises several and preferably three quartz tubes 17 placed in parallel the one above the other and the emitted radiation is directed by the suitably adjusted reflector not only on the cut surfaces but also on the sheet section surfaces above and below in the welding zone.

The U-section reflector increases the rate of transfer of energy. The reflector substantially prevents radiation to the rear and the reflector also holds the hot air rising at the radiation source due to convection, so that the effects of both radiation and convection are thereby intensified.

The contraction of the sheet into a thickened weld because of the orientation stress causes the edge of the sheet to draw away from the quartz tubes. The energy absorption can be raised by advancing the quartz tubes to compensate increasing shrinkage of the sheet by placing the quartz tubes so that their axes are at an acute angle to the end of the frame, whilst the roller chains remain parallel to the frame axis.

The width of the weld increases in proportion to the width of the projecting sheet ends. In order to limit the width of the weld rotary knives 44 are provided and mounted so that they can be moved towards and away from the strap ends of the chains. In order to separate the cutoffs more readily from the plastics sheet sections the knife blades cooperate with the edge of a steel counterblade 45.

We claim:

1. Apparatus for producing welded bags from thermoplastic tubular sheeting by means of radiant heat, comprising a horizontal frame, a plurality of parallel, horizontally disposed slide rails which are interconnected by laterally expandable lazy tongs and which are adapted to carry the sheet sections; two vertically disposed pairs of chains travelling on each side of and in spaced relationship to the slide rails in horizontal paths over motor-driven chain wheels in such manner that pressure-contact members of respective chains of each pair are in pressure contact in the plane of the slide rails; opposing guide rails for guiding therebetween the pressure-contact members of said chains; a source of radiant heat adjacent to each of the two pairs of chains; means for adjusting the position of said source in relation to the outer edges of the chains; cooling means on respective guide rails for cooling the same; said cooled guide rails jutting out towards the source of radiant heat and projecting beyond the pressure contact members between the guide rails; a pair of short steel tapes cooled by cooling means and horizontally running in the direction of travel at the rear end of and parallel to the chains over two motor-driven wheels in such manner that the middle strands of each pair of steel tapes are in pressure contact; two shaping stations comprising two pairs of grooved rollers; and means urging respective pairs of said rollers toward each other as far as minimum clearance stop means will permit.

2. Apparatus as claimed in claim 1, wherein the first-mentioned cooling means are located between the chain and the source of radiant heat.

3. Apparatus as claimed in claim 1, wherein the guide rails are harder than the chains.

4. Apparatus as claimed in claim 1, wherein the guide rails are hard chromium plated.

5. Apparatus as claimed in claim 1, wherein the chain links of the chains are supported by plastic strips.

6. Apparatus as claimed in claim 1, wherein the second-mentioned cooling means comprises cooling tubes which are connected to a supply pipe and the supply pipe contains a valve.

7. Apparatus as claimed in claim 1, wherein a spring is provided between the frame and the roller shaft for spring-loading the grooved rollers.

8. Apparatus as claimed in claim 1, wherein, at the front end of the apparatus and at right angles to the plane of the two pressure contacting portions of the pair of chains, a motor-driven rotating knife is provided which is continuously adjustable positionally in relation to the chain edges, and which cooperates with a fixed counterblade.

9. Apparatus as claimed in claim 1, wherein said source is quartz tubes which are movably mounted and enclosed on the outside by a reflector.

10. Apparatus as claimed in claim 1, wherein the said source is quartz tubes which are mounted to be adjustably movable together with a reflector.

References Cited

UNITED STATES PATENTS

| | | | |
|---|---|---|---|
| 2,800,162 | 7/1957 | Rohdin | 156—498 X |
| 3,367,261 | 2/1968 | Kashiwagi | 100—93 |
| 3,383,265 | 5/1968 | Garabedian | 156—380 X |
| 3,388,017 | 6/1968 | Grimsley et al. | 156—498 X |
| 3,408,242 | 10/1968 | Rochla | 156—380 X |
| 2,224,370 | 12/1940 | Wescott | 156—498 X |
| 2,248,840 | 7/1941 | Wilkoff | 156—380 |
| 2,358,455 | 9/1944 | Hallman | 156—38 |
| 2,504,500 | 4/1950 | Collins | 156—38 |
| 2,525,749 | 10/1950 | MacCaffray | 156—38 |
| 2,788,838 | 4/1957 | Crabbe et al. | 156—38 |
| 2,796,914 | 6/1957 | Park | 156—49 |
| 2,995,482 | 8/1961 | Boyce et al. | 156—499 |

HAROLD ANSHER, Primary Examiner

U.S. Cl. X.R.

156—282, 311, 498, 499